United States Patent
Colombel et al.

(10) Patent No.: US 10,507,757 B2
(45) Date of Patent: Dec. 17, 2019

(54) LUMINOUS DEVICE FOR LIGHTING THE ROAD, SIGNALLING OR INTERIOR LIGHTING

(71) Applicant: VALEO VISION, Bobigny (FR)

(72) Inventors: Jean-Marc Colombel, Angers (FR); Stephane Patrizi, Angers (FR); Francois Gratecap, Angers (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/129,264

(22) Filed: Sep. 12, 2018

(65) Prior Publication Data

US 2019/0092215 A1    Mar. 28, 2019

(30) Foreign Application Priority Data

Sep. 12, 2017 (FR) .................................... 17 58440

(51) Int. Cl.
*B60Q 1/00* (2006.01)
*F21S 41/43* (2018.01)
*F21S 41/24* (2018.01)
*F21S 43/50* (2018.01)
*F21S 41/50* (2018.01)
*F21S 41/143* (2018.01)

(52) U.S. Cl.
CPC ......... *B60Q 1/0005* (2013.01); *B60Q 1/0017* (2013.01); *F21S 41/143* (2018.01); *F21S 41/24* (2018.01); *F21S 41/43* (2018.01); *F21S 41/50* (2018.01); *F21S 43/50* (2018.01)

(58) Field of Classification Search
CPC ... B60Q 1/0005; B60Q 1/0017; F21S 41/143; F21S 41/24; F21S 41/43; F21S 43/50; F21S 41/50
See application file for complete search history.

(56) References Cited

U.S. PATENT DOCUMENTS

| | | | |
|---|---|---|---|
| 2001/0043477 A1 | 11/2001 | Ott et al. | |
| 2003/0012030 A1 | 1/2003 | Koshiro et al. | |
| 2008/0094842 A1 | 4/2008 | King et al. | |
| 2009/0077846 A1* | 3/2009 | Hill | C09D 5/24 40/544 |
| 2017/0241613 A1* | 8/2017 | Faoucher | H05B 37/0227 |
| 2018/0180239 A1* | 6/2018 | Zorn | F21S 41/28 |
| 2019/0078751 A1* | 3/2019 | Colombel | F21S 41/30 |

FOREIGN PATENT DOCUMENTS

| | | |
|---|---|---|
| BE | 489618 | 6/1949 |
| EP | 1 113 217 A2 | 7/2001 |
| EP | 1 916 471 A1 | 4/2008 |
| FR | 2 927 404 A1 | 8/2009 |

OTHER PUBLICATIONS

French Preliminary Search Report dated Feb. 23, 2018 in French Application 17 58440 filed on Sep. 12, 2017 (with English Translation of Categories of Cited Documents).

* cited by examiner

*Primary Examiner* — Tracie Y Green
(74) *Attorney, Agent, or Firm* — Oblon, McClelland, Maier & Neustadt, L.L.P.

(57) ABSTRACT

A luminous motor-vehicle device. The luminous device includes: a segmenting part including a plurality of through-cavities; a plurality of light sources upstream of the segmenting part; a mask that blocks at least one through-cavity of the segmenting part, said mask being able to be partially passed through by light. The luminous device is arranged so that each through-cavity directly or indirectly receives light from at least one separate light source.

Figure 1:
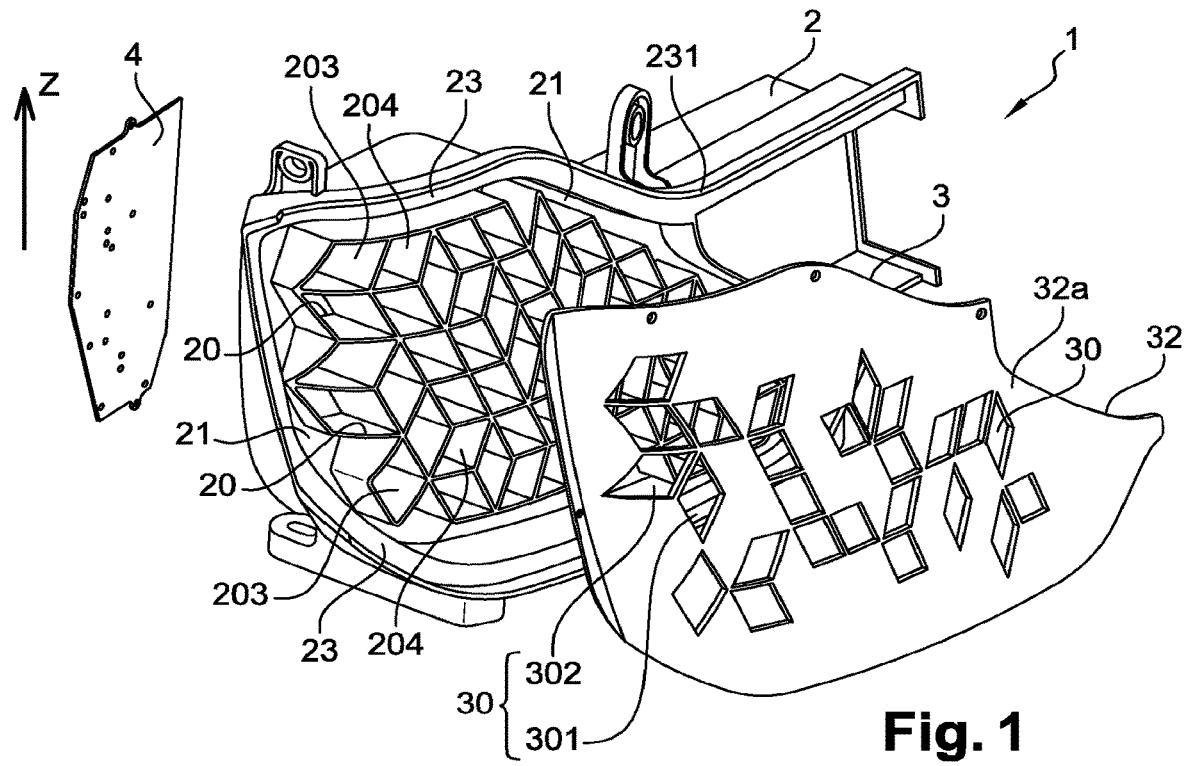

20 Claims, 1 Drawing Sheet ial is a # LUMINOUS DEVICE FOR LIGHTING THE ROAD, SIGNALLING OR INTERIOR LIGHTING

FIELD OF INVENTION

The invention relates to the field of luminous devices for lighting the road and/or signalling, or for interior lighting for motor vehicles. More particularly, the present invention relates to a luminous device the aspect of which when it is turned off, also called its turned-off aspect, is different from its aspect when it is turned on, also called its turned-on aspect.

BACKGROUND OF INVENTION

In the field of the lighting of motor vehicles, manufacturers are seeking not only to improve the lighting and/or signalling function of luminous devices but also to add other technical and/or aesthetic particularities thereto in order to make the users of the vehicle entirely happy.

Among these particularities, manufacturers have added what is called a "ghost effect" technology to luminous devices. This technology consists in giving the luminous device a turned-on aspect that is unexpectedly different from its turned-off aspect. For example, when the luminous device is turned off, it may have a plain glossy black aspect that gives the user the impression that when the device is turned on the light beam will be uniform. However, when the luminous device is turned on, a luminous pattern appears. This pattern may be purely decorative, include a logo of the manufacturer, or even perform a signalling function, such as that of a night-time position light.

There are various solutions allowing a "ghost effect" to be created. However, these solutions could still be improved.

SUMMARY OF INVENTION

To this end, the invention relates to a luminous motor-vehicle device comprising:
  a segmenting part including a plurality of through-cavities;
  a plurality of light sources upstream of the segmenting part;
  a mask that blocks at least one through-cavity of the segmenting part, said mask being able to be partially passed through by light.

Furthermore, the luminous device is arranged so that each cavity directly or indirectly receives light from at least one separate light source. In other words, each light source emits light towards a single corresponding cavity.

Thus, in the turned-off state of the luminous device, the cavities blocked by the mask appear to be inactive zones, i.e. zones that are expected to keep the same aspect when the luminous device is turned on. However, given the particularity of the mask, in the turned-on state of the luminous device, the blocked portions become luminous zones unexpectedly. Thus, the turned-on aspect of the luminous device is different from its turned-off aspect. The luminous device according to the invention indeed creates what is called a "ghost effect".

Optionally, the intensity of the light passing through the blocked cavities may be lower than that of the non-blocked cavities. Thus, various light intensities are perceived over the whole of the illuminating area of the luminous device.

Moreover, the cavities passed through by the light rays allow the perception of the edges of the cavities, and therefore the shape of the latter, to be improved.

The luminous device according to the invention may optionally have one or more of the following features:
  the mask is made from a scattering and translucent material; by definition, a translucent material is a material that lets light pass but it does not allow an object seen through this material to be clearly distinguished;
  alternatively to the preceding paragraph, the mask may only be translucent;
  the material from which the mask is made is dark; for example, the mask is made from a polymer from the family of the polycarbonates or of the polyethersulfones, additives giving the mask its dark hue; the mask may also be made from any material that is transparent and potentially injection-mouldable or thermoformable, for example from a polymer of the polymethylmethacrylate or polyurethane family, to which additives giving the mask its dark hue may be added;
  the mask is produced from a material that lets pass 5% to 20% of the light that reaches it;
  the mask includes at least one apertured zone, the mask and the segmenting part being arranged with respect to each other so that the apertured zone is placed facing at least one through-cavity;
  a transparent element that lets pass a percentage of light higher than that of the mask is mounted on the mask and covers the apertured zone of the mask; by definition, a "transparent" element is an element that lets light pass and that allows the shape of an object seen through this element to be clearly distinguished; by way of example, the transparent element may be parts made of polymethyl methacrylate (PMMA); colouring additives may be added to give the transparent element a colour for aesthetic reasons;
  each through-cavity is arranged facing at least one separate light source; thus, there is no need to employ complex systems, in particular light guides, to convey the light to the through-cavities;
  the segmenting part and the mask are spaced apart from each other;
  the space between the segmenting part and the mask is comprised between 1.5 mm and 2.5 mm; this is an optimal but nonlimiting range of values allowing leakage of light from between the segmenting part and the mask to be avoided;
  the segmenting part is covered with a coating; the aim of the coating may be to protect the part from scratches, to improve its resistance to heat, etc.;
  according to the preceding paragraph, the coating is reflective; thus, light rays that pass through the cavities are reflected by the reflective coating so as to follow a defined light-emission direction; there is therefore less loss of the light rays exiting from the cavity;
  optionally and nonlimitingly, each through-cavity has a depth comprised between 5 mm and 75 mm;
  the light sources have an arrangement and connections in the luminous device allowing them to be driven independently of one another; thus, this allows the possible ways in which the luminous device may be turned on to be enriched; in particular, it is possible, by means of a driving device, to turn on the light sources in various ways, this being highly valued for "welcome scenarios"; specifically, in order to further satisfy users, certain manufacturers make provision for a "welcome scenario" when the vehicle is started up; this scenario may consist in making the luminous devices flash several times, or in sequentially turning on, for a short length of time, all the luminous devices of the vehicle; when each cavity receives at least one light source and these sources are managed by the driving device, it is possible to adjust the illumination of each of the cavities, whether they be blocked or not by the mask, so as to produce a lighting sequence suitable for a "welcome scenario";

the intensity of each of the light sources is able to be adjusted, in particular independently of the others; thus, it is possible, by means of a driving device, to not only turn on or turn off the light source, but also to adjust the intensity and/or the colour of each light source; when each cavity receives at least one light source, it is possible to drive the light sources so that each through-cavity is turned on with the intensity and colour desired for each cavity;

the through-cavities are produced in a base of the segmenting part; the mask has an outline of similar shape to that of the peripheral edges of the base; moreover, the mask is set into the peripheral edges so as to cover all of a front face of the base;

according to the preceding paragraph, each peripheral edge of the base has a shoulder against which the border of the mask abuts with a view to obtaining a perfect alignment of the mask with respect to the segmenting part;

the segmenting part comprises a positioning means housed in a curved section of a lateral edge of the mask and in contact with the mask; the positioning means may be a stop, in particular a cylindrical stop.

The invention furthermore relates to a process for assembling a luminous device according to the invention.

According to the invention, the process comprises the steps of:

providing a luminous vehicle device comprising a segmenting part with a given number and a given arrangement of through-cavities, choosing a mask from a plurality of masks each comprising a different number and a different arrangement of apertured zones, mounting the chosen mask on the segmenting part.

BRIEF DESCRIPTION OF VIEWS OF DRAWINGS

Figure 2:
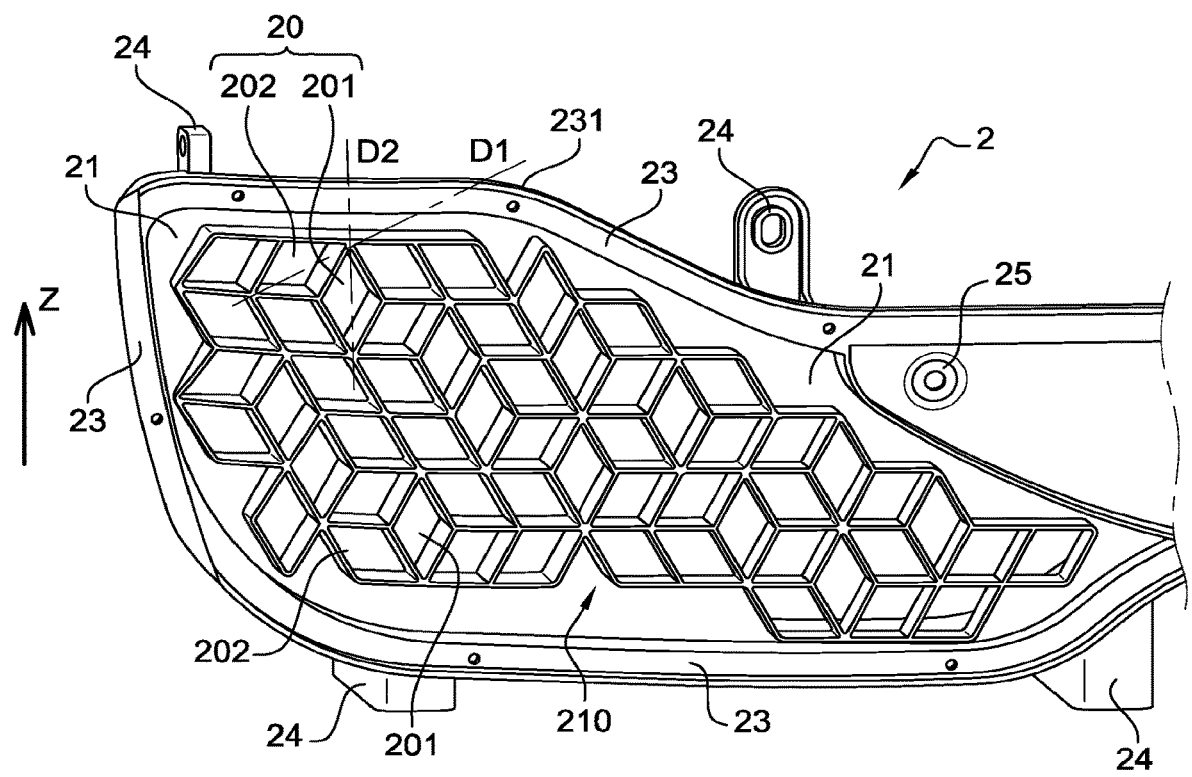

Other innovative features and advantages will become apparent from the following description, which is given by way of completely nonlimiting indication, with reference to the appended drawings, in which:

FIG. 1 schematically shows an perspective exploded view of a luminous device according to one example embodiment of the invention;

FIG. 2 schematically shows a front view of a segmenting part forming part of the luminous device of FIG. 1.

DETAILED DESCRIPTION OF INVENTION

Unless otherwise indicated, in the present description, the terms "front", "back", "lower", "upper", "upstream" and "downstream" refer to the direction of emission of light out of the corresponding luminous device. Moreover, the terms "horizontal", "vertical" and "transverse" are defined with respect to the orientation of the luminous device once it is mounted in the vehicle.

With reference to FIG. 1, a luminous device 1 comprises a segmenting part 2, a mask 3 and a plurality of printed circuit boards 4. It will be noted that, for the sake of clarity, a single printed circuit board 4 has been illustrated in FIG. 1.

The printed circuit boards 4 are fastened to the back of the segmenting part 2 whereas the mask 3 is fastened to the front of the same part. The printed circuit boards 4 are connected to a driving device (not illustrated) which is capable of controlling, driving and supplying power to one or more electronic components. This driving device is also called a driver.

The driving device may be mounted in or on the luminous device. For example, the driving device may be mounted on the printed circuit board 4 bearing the light sources.

Alternatively, the driving device may be arranged in the vehicle at a distance from the luminous device.

The segmenting part 2 comprises a plurality of through-cavities 20 that are placed beside one another. In the illustrated example, each through-cavity 20 has a rhombus shape. Depending on the orientation of the through-cavities 20, the latter are divided into two groups: a first group 201 in which the rhombus shape has a diagonal parallel to vertical, which is illustrated by an axis Z in FIGS. 1 and 2, and a second group 202 in which the two diagonals of the rhombus shape are inclined with respect to vertical.

Of course, in other example embodiments, the through-cavities may have other shapes and orientations.

In this example, each through-cavity 20 has a depth, measured between its back and front, of about 50 mm. The through-cavities 20 protrude frontwards with respect to a base 21 of the segmenting part 2. This base 21 is encircled by peripheral edges 23 that jut out from the front face 210 of the base 21.

The segmenting part 2 furthermore comprises means 24 for fastening to a casing (not illustrated) that is intended to be installed in a location dedicated to the luminous device in a vehicle. This casing may be located at the front or at the rear depending on the luminous function performed by the luminous device 1, or even in the passenger compartment of the vehicle.

In the illustrated example, the segmenting part 2 is made of plastic via an injection-moulding process. The segmenting part may be made from another material, for example a composite for good shock resistance.

The printed circuit board 4 shown in FIG. 1 bears a plurality of light sources (not illustrated). A light source may comprise at least one light-emitting diode (LED for short).

The light sources are arranged on the printed circuit board 4 so that once this board has been fastened to the segmenting part 2, at least one light source is placed facing a corresponding through-cavity 20. In this case, each through-cavity 20 is said to directly receive the light from at least one light source. Each light source consists of one or more LEDs, for example two LEDs, that emit light towards a corresponding through-cavity.

In another example, each through cavity 20 may receive light from a light guide. The latter is positioned with respect to the light sources so that the emitted light is satisfactorily collected and guided to the corresponding cavity. In this configuration, the light sources may be located far from the segmenting part.

The mask 3 is installed in front of the segmenting part 2. In the illustrated example, the mask 3 is screwed to the segmenting part 2 but other fastening means may be envisaged.

The distance between the mask 3 and the segmenting part 2 is for example about 2 mm. Preferably, this value lies in a range between 1.5 mm and 2.5 mm in order to ensure a good distinction of the through-cavities 20 from one another when the light sources are turned on. Such a distance also allows leakage through the space between the mask 3 and the segmenting part 2 to be avoided as such leakage could potentially adversely affect the attractiveness of the luminous device 1 when it is turned on.

The mask 3 has an outline of similar shape to the outline of the base 21. In the illustrated example, since the base 21 is encircled by peripheral edges 23, the mask 3 also has an outline of similar shape to that of the edges 23. Here, the mask 3 is set into the edges 23 so as to cover all of the front face 210 of the base 21 when the mask 3 is fastened to the segmenting part 2.

Each edge 23 furthermore has a shoulder 231 against which the border of the mask 3 abuts. The shoulder 231 allows the mask 3 to be correctly positioned with respect to the segmenting part. In this way, a perfect alignment of the through-cavities with the corresponding apertured zones is obtained.

Alternatively or in addition to the preceding paragraph, the segmenting part 2 may comprise other positioning means. In the illustrated example, on the right of the segmenting part 2, there is a housing 25 that is designed to receive a positioning means, here a cylindrical stop. Here, the term "right" is understood to mean on the right of FIG. 2 as drawn. The stop is arranged so that when the mask 3 is fastened to the segmenting part 2, the stop becomes housed in a curved section 32a of a straight lateral edge 32 of the mask 3, and makes contact with the mask.

Apertured zones 30 are produced in the mask 3 so that when the mask 3 is fastened to the segmenting part 2, each apertured zone 30 is located facing a corresponding through-cavity 20.

According to the invention, as here, each apertured zone may have the same shape and the same orientation as those of the corresponding through-cavity 20. Here, the apertured zones 30 are rhombi the diagonal of which is parallel, rhombi 301, or inclined, rhombi 302, with respect to vertical.

Optionally, each apertured zone 30 is covered with a transparent element, i.e. an element that lets light pass and that allows an object seen through this element to be clearly distinguished. For example, the transparent element is a part made of polymethyl methacrylate (PMMA) or Plexiglas®. Alternatively, a transparent second mask of smooth aspect may be laminated to the dark scattering mask.

In the illustrated example, the mask 3 is made from a material that lets pass 5 to 20% of light. In addition, this material is scattering and translucent. In particular, the scattering material spreads light uniformly for an observer. The expression "translucent material" is understood to mean a material that lets light rays pass but does not allow the outlines of an object seen through this material to be clearly distinguished.

Moreover, the mask may have a dark or deep colour. In particular, in this example, the mask 3 is black in colour. Thus, by virtue of the black or dark hue of the mask, only the cavities facing the apertured zones, which are called non-blocked cavities 203, are visible from the exterior, whereas the cavities blocked by the mask 204 are not. In this way, in the turned-off state of the luminous device, the latter gives the user the impression that only the locations of the non-blocked visible cavities 203 will be illuminated and that the other locations, perceived to be black or dark, will keep the same aspect when the luminous device is turned on.

When the device is turned on, the blocked cavities 204 are also visible because the mask partially lets light pass, and because each cavity receives at least one light source. This way in which the device lights up thus surprises the user, who is not expecting to see the locations of the luminous device 1 perceived to be black or dark light up.

Generally, the light intensity of the cavities 204 blocked by the mask may be lower than the cavities 203 located facing the apertured zones. For example, the light-emitting diodes may be of the same power whether they interact with a blocked cavity 204 or a non-blocked cavity 203.

Generally, in particular by virtue of the printed circuit board 4 and the driving device, it is envisageable to turn on the luminous device 1 in a plurality of ways. For example, it is possible to light up the non-blocked or visible through-cavities 203 one by one and then to light up the blocked through-cavities 204 all at the same time. Alternatively, it is possible to light up all the non-blocked and blocked cavities 203 and 204 one after the other in a given order, for example from top to bottom or from left to right of the luminous device.

For a luminous device for a particular type of vehicle, for example hatchback cars, a manufacturer may produce a standard casing and a plurality of segmenting parts having the same outline and the same fastening means intended to interact with this standard casing. The segmenting parts are different in that they include through-cavities of different shapes and/or the arrangement of which is different. Thus, depending on the model in question of this vehicle, the manufacturer will possibly choose any given one of these segmenting parts.

Moreover, alternatively or in addition to the preceding paragraph, a manufacturer may produce a standard segmenting part and a plurality of masks, each including a different pattern, i.e. the arrangement and/or the shape of the apertured zones of which are/is different. In this way, the manufacturer may tailor the configuration of the luminous device to a family, also called a sub-range, of a given type of vehicle in order to give a specific signature to this family.

The manufacturer may also ask a buyer to choose the mask that he likes most from a set of masks listed in a catalogue during the purchase of the vehicle.

Of course, it is possible to make many modifications to the invention without however departing from the scope thereof.

The invention claimed is:

1. A luminous device, said device comprising:
    a segmenting part including a plurality of through-cavities;
    a plurality of light sources upstream of the segmenting part; and
    a mask that blocks at least one through-cavity of the segmenting part, said mask being able to be partially passed through by light,
    wherein said luminous device is arranged so that each through-cavity directly or indirectly receives light from at least one separate light source, and
    wherein the mask includes at least one apertured zone and in that the mask and the segmenting part are arranged with respect to each other so that the apertured zone is placed facing at least one through-cavity.

2. The luminous device according to claim 1, wherein the mask is made from a scattering and translucent material.

3. The luminous device according to claim 1, wherein the material from which the mask is made is dark.

4. The luminous device according to claim 1, wherein the mask is made from a material that lets pass 5 to 20% of the light that reaches it.

5. The luminous device according to claim 1, wherein a transparent element that lets pass a percentage of light higher than that of the mask covers the apertured zone of the mask.

6. The luminous device according to claim 1, wherein each through-cavity is arranged facing at least one separate light source.

7. The luminous device according to claim 1, wherein the segmenting part and the mask are spaced apart from each other.

8. The luminous device according to claim 7, wherein the space between the segmenting part and the mask is comprised between 1.5 mm and 2.5 mm.

9. The luminous device according to claim 1, wherein the segmenting part is covered with a reflective coating.

10. The luminous device according to claim 1, wherein the light sources have an arrangement and connections in the luminous device allowing them to be driven independently of one another.

11. The luminous device according to claim 1, wherein the luminous device comprises at least one device for driving the light sources.

12. The luminous device according to claim 1, wherein the through-cavities are produced in a base of the segmenting part, the mask having an outline of similar shape to that of the peripheral edges of the base and being set into the peripheral edges so as to cover all of a front face of the base.

13. The luminous device according to claim 1, wherein the segmenting part comprises a positioning means housed in a curved section of a lateral edge of the mask and in contact with the mask.

14. The luminous device for assembling a luminous device according to claim 1, wherein said process comprises:
providing a luminous vehicle device comprising a segmenting part with a given number and a given arrangement of through-cavities,
choosing a mask from a plurality of masks each comprising a different number and a different arrangement of apertured zones,
mounting the chosen mask on the segmenting part.

15. The luminous device according to claim 2, wherein the material from which the mask is made is dark.

16. The luminous device according to claim 2, wherein the mask is made from a material that lets pass 5 to 20% of the light that reaches it.

17. The luminous device according to claim 2, wherein each through-cavity is arranged facing at least one separate light source.

18. The luminous device according to claim 2, wherein the segmenting part and the mask are spaced apart from each other.

19. The luminous device according to claim 1, wherein the luminous device is part of on a motor vehicle.

20. A luminous device, said device comprising:
a segmenting part including a plurality of through-cavities;
a plurality of light sources upstream of the segmenting part; and
a translucent mask that blocks at least one through-cavity of the segmenting part, said mask being able to be partially passed through by light,
wherein said luminous device is arranged so that each through-cavity directly or indirectly receives light from at least one separate light source.

* * * * *